April 29, 1958    J. O. FORSTER    2,832,129
TOOL FOR INSERTING WIRE COIL SCREW THREADS
Filed Jan. 11, 1954

INVENTOR.
John O. Forster
BY *Walter S. Bleston*

ATTORNEY

2,832,129

TOOL FOR INSERTING WIRE COIL SCREW THREADS

John O. Forster, Harrison, N. Y., assignor to Heli-Coil Corporation, Danbury, Conn., a corporation of Connecticut Application January 11, 1954, Serial No. 403,410

2 Claims. (Cl. 29—240.5)

The invention relates to a tool for inserting screw thread forming wire coils in bores or holes of nut or boss members. Wire coils are frequently used in order to provide a boss or nut of a relatively soft material with a resistant inner thread lining of a high strength material.

Generally, the holes to be lined with such coils are tapped and the lining fits the tapped thread form. However, in certain instances, even a cylindrical hole in a boss may be lined with a thread-forming wire coil, and the coil may be held in the hole merely by friction, or it may cut or otherwise cause in the boss material the formation of an inner thread which it lines. Therefore, the coils serving the indicated purpose are usually wound with a larger diameter than the corresponding diameter in the boss or nut so that the coil must be contracted for insertion and will spring into its seat in the hole when inserted. The contraction of the coil has to start from the leading end to which a suitable torque has to be applied from the interior of the coil, otherwise the required contraction apparently cannot be accomplished owing to the the resiliency of the coil.

In order to allow a tool to get hold of the leading convolution for the application of the mentioned torque the leading end convolution of a conventional coil of the mentioned type is specially shaped, e. g. provided with a diametrical tang, whereby a grip for the tool is formed. Furthermore, in many instances, the diameter of the leading end convolution is reduced in respect to the coil body in order to facilitate the start of an insertion. (Hereinbefore and hereinafter the term "leading" coil end means that end of the coil which leads during the operation of inserting the coil in a boss and the term "boss" means any structure, part or member provided with a hole, whether tapped or cylindrical, which is or is to be lined with such coil.)

Generally the formation of a special grip at the leading coil end and other requirements connected therewith involve many more complicated operations in the production of the coil than one might anticipate. In fact the cost of these operations may easily run up to 25% and more of the total cost of an insert coil.

The invention aims to avoid the mentioned drawbacks and to provide a tool which can be introduced into the interior of a uniformly coiled insert and grip the one end thereof without requiring a special formation of that end. Of course, instead of introducing the tool into the interior of the coil the latter may be slid on the tool so as to encompass it or at least a portion thereof.

The invention further aims to provide a tool whereby in order to apply a desired contracting torque the leading end of a coil can be clamped in an axial direction rather than in a radial direction in which the conventional tools operate.

The tool according to the invention essentially comprises two co-axial parts, the one axially movable in relation to the other so as to form clamping members to hold a leading coil end during a rotation of the tool and to apply a contracting torque against a resistance acting on another portion of the coil body.

The invention further aims to provide a tool of the mentioned type which may be charged with a cylindrical screw thread forming wire coil, and which will clamp between two of its parts, in the axial direction the leading coil convolution when the latter has been urged between said parts by a radial pressure against the resilient face of the coil.

Further objects and details of the invention will be apparent from the description given hereinafter and the accompanying drawing illustrating an embodiment thereof by way of example.

Figure 1:
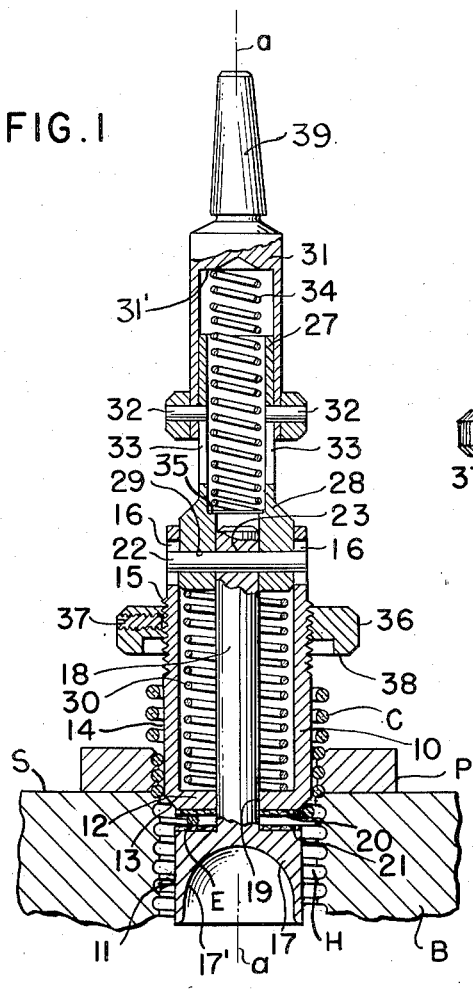
Figure 1 is a longitudinal section of a tool according to the invention.

Referring now to the drawing, the tool according to the invention comprises two main clamping members 10 and 11. Member 10 is a hollow cylinder with a bottom 12 at its lower end. The corner 13 between the side wall 14 and the bottom is preferably rounded or chamfered as shown in Figure 1. For a purpose to be explained hereinafter the side-wall 14 may be provided with an external screw thread 15, and with diametrically opposite inclined slots 16 the shape of which is clearly visible in Fig. 2. The second clamping member 11 consists of a head 17 on a shank 18 which extends through an axial hole 19 in the bottom 12 of member 10, so that the head is located underneath and co-axial with the latter. Thus, by shifting the member 11 downward a space will be opened between the head 17 and the bottom 12 to receive therein the end E of a wire thread insert coil C and to clamp such end between the mentioned parts when the member 11 is shifted upward in relation to the member 10, as it will be explained hereinafter. In order to improve the friction of the clamping portions the adjacent faces of the bottom 12 and the head 17 may be provided with friction-increasing means e. g. both may be covered by adhering layers 20 and 21 of nylon.

In Fig. 1 the head 17 is a cylinder of considerable height and provided with a cavity 17' in order to reduce its weight. This form is preferable for use in through-going holes and when the tool is operated by hand as the cylindrical head may serve as a pilot for the tool. For use in blind holes, however, the height of the cylinder may be reduced so as to be just of sufficient strength to withstand the clamping force. In other words, the cylinder may be reduced to a disc.

The members 10 and 11 are connected for rotation about their axis a—a by a pin 22 which extends through the shank 18 and engages with its ends in the inclined slots 16. Whereas this pin exactly fits the hole 23 in the shank, its diameter is noticeably smaller than the width of the slots 16 in the axial direction. In consequence a slight axial movement of member 11 relatively to the member 10 or vice versa is possible in order to open or close the space between the bottom 12 and head 17 for the receiving and clamping, respectively, of the coil end E. The slot has two axial flanks 24 and 25 and two inclined sides of which the upper one is denoted by 26.

Figure 2:
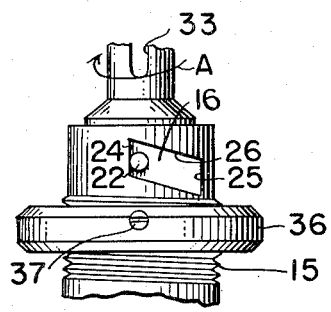
Figure 2 is a partial side elevation thereof.

Means are provided to apply a torque to the pin 22 to rotate the members 10 and 11 about the axis a—a in the direction of the arrow A in Fig. 2 if the tool is to be used for a right-handed thread. In the illustrated embodiment this means comprises a tubular member 27 which has a lower relatively thick portion 28 which fits into the member 10 and encompasses the upper end of the shank 18. It is provided with a transverse bore 29 into which the pin 22 engages. Between the tube portion 28 and the bottom 12 of the member 10, a compression spring 30 is inserted which furnishes the required force to clamp the coil end E between the layers 20 and 21. When a torque in the direction of the arrow A is applied to the tube 27 both members 10 and 11 will be taken along owing to pin 22 bearing against the slot flank 24.

In using the tool a certain downward pressure is generally to be applied which however should not exceed a certain maximum in order to avoid a deformation of the coil end E beyond its limit of elasticity. For this reason, a driving piece 31 is telescopically connected with the tube 27 by means of two opposite pins 32 which are secured in the side wall of piece 31 and project into axial slots 33, respectively of the tube 27. A second spring 34 of slight force is interpositioned between an inner shoulder 35 of the tube 27 and the bottom 31' of the head portion of the piece 31. Thus, unless the tool is handled contrary to directions, the only force remaining against the lower part of the tool is exerted by the spring 34. The top end 39 of the driving piece 31 is so formed that a torque can be applied to it. In the illustrated embodiment, the top end 39 is a standard Morse cone for use with a power tool spindle. If another drive is to be used the top end may be shaped accordingly.

Means are provided for shifting the member 10 a limited distance upwards in relation to member 11 against the restraint of the spring 30 in order to release a coil end E from clamping engagement, or to spread the members 10 and 11 apart for the reception of a coil end E. These means comprise the aforementioned inclined slots 16 of member 11 into which the pin 22 engages, and a collar 36 screwed on the thread 15 and secured in a desired position by a set screw 37. Collar 36 serves as a grip to turn the member 10 in the direction of the arrow A whereby the member 10 will be raised owing to the pin 22 bearing against the inclined side 26 of slot 16. Thereby the clamping faces at 20 and 21 will be spread apart so that a coil end E can be placed therebetween, whereupon by a turn of the collar 36 in the opposite direction the clamp will be closed. It will be clear that for the purpose just described a screw thread connection between the collar 36 and member 10 would not be required and that any other gripping means provided on or in connection with the member 10 could be substituted. However in the illustrated embodiment the adjustable collar 36 serves a second purpose. In many instances, it is desired that a coil C will be inserted into the hole of a boss B to a predetermined depth. This can be attained with the aid of the collar. When namely in the course of the inserting operation the lower face 38 of the collar comes to bear on another surface, as e. g. the top surface of the boss into which the coil has been screwed, further advancement of the member 10 in the axial direction will be stopped. However, the rotation and simultaneous axial movement of member 11 will continue as the pin 22 can move axially downward in slot 16. Thereby the clamp constituted by members 10 and 11 will open so as to release the coil end E and permit it to spring outward. Now, it will be clear that by turning the collar in relation to member 10 in the one or the other direction and, then, securing it by means of set screws 37, the depth to which a coil will be inserted by means of the tool can be adjusted.

Figure 3:
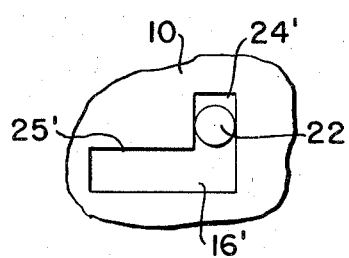
Figure 3 is a side elevation of a modified part.

Instead of the form illustrated in Fig. 2, L shaped slots 16' may be used as shown in Fig. 3. Each slot 16' has an axially directed arm 24' and a peripherally directed arm 25'. During the operation of the tool the pin 22 will be movable in the axial arm 24'. For the purpose, however, of opening the clamp, the slotted member 10 will be shifted upwards and then turned so that the pin 22 can enter the peripheral arm and hold the clamp open. To close the clamp member 10 will be turned back whereupon spring 30 will urge member 10 downward while pin 22 moves upwards in slot arm 25.

It has been stated that in most instances the coils to be inserted with the aid of the tool are of a diameter larger than the corresponding diameter of the hole in the boss to be lined by the coil which therefore has to be contracted during or before the insertion. This contraction is accomplished by a contracting torque acting between the leading coil end and a portion of the coil body. In other words, if a torque is applied to the coil end in the direction the coil is wound, a reaction must take hold of some portion of the coil body to resist the turning in order to cause the required contraction. This reaction can be set up by the friction between the coil convolutions and the wall or thread flanks of the hole in the boss. However, in most instances it is preferable to use a so-called prewinder e. g. a device consisting of a plate or block P having a conical inner screw thread of a maximum diameter according to a coil prior to being contracted and a minimum diameter according to the diameter to which the coil is to be contracted. (A prewinder of such kind is more fully described e. g. in U. S. Patent No. 2,316,231 to Evans.) The prewinder denoted by P is shown in Fig. 1 positioned on the top surface S of a boss B provided with a threaded hole H to be lined with the coil C. The prewinder P may be held in correct position by hand or it may be secured by means not shown either to the boss B or to a stationary part of the tool.

In order to use the tool, it will be raised above the top surface of the prewinder or if no prewinder is employed above the top surface of the boss so high that a coil E can be slid from below on the member 10. The wire of which the coil is wound may be of any suitable and desired cross-section. By gripping the collar which is fixed in a desired position, the bottom 12 of member 10 will be separated from head 17 of member 11 in the manner explained in the description of the slots 16, or 16'. Then the end convolution E will be pushed between the layers 20 and 21 whereupon the member 10 will be turned back to clamp the convolution E between the two members. The coil in this position will be slightly spaced from the cylindrical member 10 the diameter of which should be equal to or a little smaller than the inner diameter of the coil after the latter has been contracted. Thereupon the tool will be lowered into the hole H of the boss with the head of member 11 leading. By applying a torque and slight downward pressure to the upper end of piece 31 the coil will be screwed through the prewinder or directly into the hole H of the boss B whereby the coil will be contracted to seat properly in the hole H. When the desired depth is reached i. e. when the properly adjusted collar 36 abuts against either the top surface of the prewinder or of boss B, the convolution E will be released and spring back to its original form or at least approximately to that form. The tool may then be withdrawn. In order to render the withdrawal possible even if the convolution E does not spring back to the same diameter as the remainder of the coil, it is advisable to make the diameter of member 11 somewhat smaller than that of member 10. After the withdrawal, the tool is ready to be loaded with another coil.

It will be apparent to those skilled in the art that many alterations and modifications of the structure shown and described are possible without departure from the essence and spirit of the invention which for that reason shall not be limited but by the scope of the appended claims.

I claim:

1. A tool for inserting a screw thread forming wire coil as a lining in a hole of a boss, comprising in co-axial relationship a first hollow cylindrical member insertable in a coil for which the tool is destined, and having its bottom end closed except for a central opening, said end having a substantially flat outer bottom surface, the diameter of said bottom surface being slightly smaller than that of the body of said first cylindrical member, a second member including a substantially flat cylindrical head facing said bottom surface and being of a diameter similar to that of said bottom surface, and a shank extending through said central opening into said first member, a spring inside said first member and operatively connected to said shank so as to urge said head towards said bottom surface of said first member, means connected to one of said members to apply a torque thereto, one of said members being provided with a slot, said other member including a pin transverse with respect to the axis of said member and engaging said slot, said slot being substantially wider than said pin and extending partially around the circumference of the slot-provided member at a slight angle to a plane transverse with respect to the axis of said member, said first member further including an abutment adjustable in the axial direction to engage a surface of said body when the tool is moved a desired distance in the direction towards said surface.

2. A tool for inserting a screw thread forming wire coil as a lining in a hole of a boss, comprising in co-axial relationship a first hollow cylindrical member insertable in a coil for which the tool is destined, and having its bottom end closed except for a central opening, said end having a substantially flat outer bottom surface, the diameter of said bottom surface being slightly smaller than that of the body of said first cylindrical member, a second member including a substantially flat cylindrical head facing said bottom surface and being of a diameter similar to that of said bottom surface, and a shank extending through said central opening into said first member, a spring inside said first member and operatively connected to said shank so as to urge said head towards said bottom surface of said first member, means connected to one of said members to apply a torque thereto, one of said members being provided with a slot, said other member including a pin transverse with respect to the axis of said member and engaging said slot, said slot being substantially wider than said pin and extending partially around the circumference of the slot-provided member at a slight angle to a plane transverse with respect to the axis of said member, said first member being provided with an external screw thread, a collar screwed on said external thread, and a set screw in said collar to secure the latter in an adjusted position for engagement with a surface of said boss.

References Cited in the file of this patent

UNITED STATES PATENTS

| | | |
|---|---|---|
| 2,108,252 | Cooper | Feb. 15, 1938 |
| 2,319,377 | Wallace et al. | May 18, 1943 |
| 2,344,750 | Stoltz | Mar. 21, 1944 |
| 2,364,288 | Haggerty | Dec. 5, 1944 |
| 2,586,805 | Forster | Feb. 26, 1952 |
| 2,641,052 | Fennema et al. | June 9, 1953 |